Patented July 6, 1943

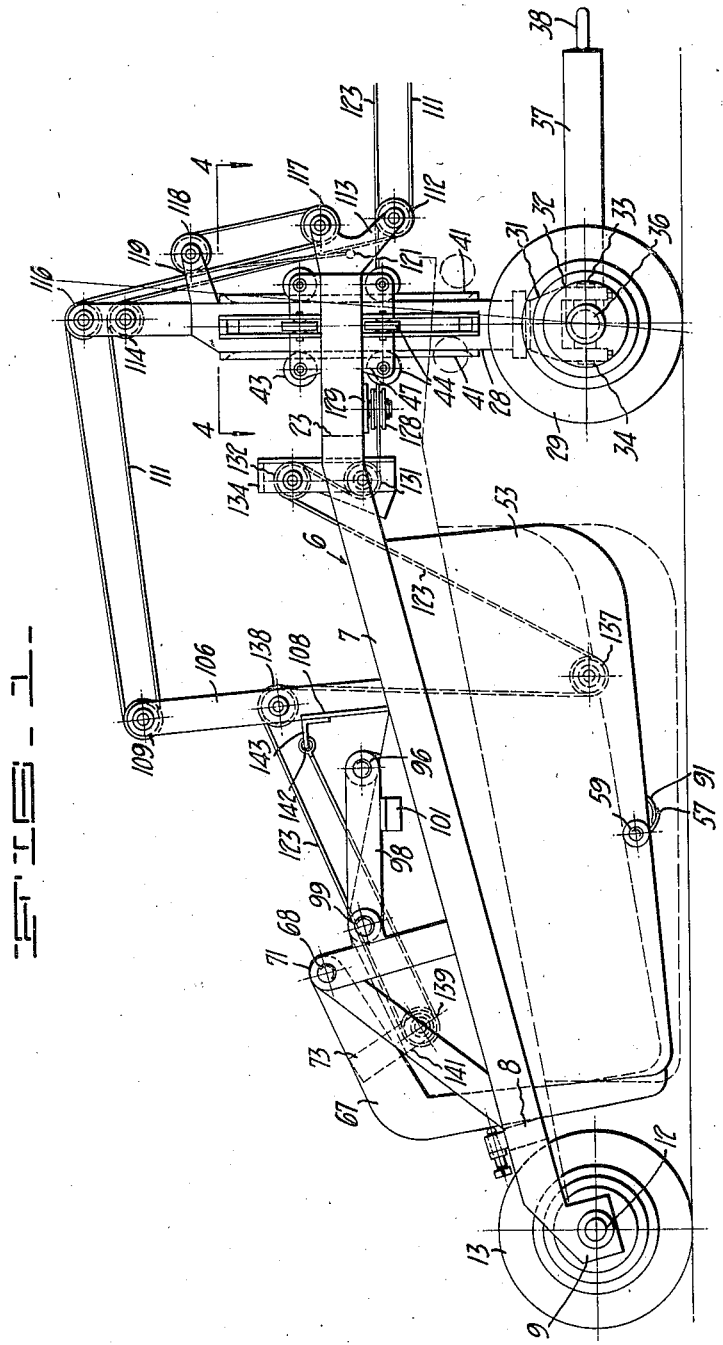

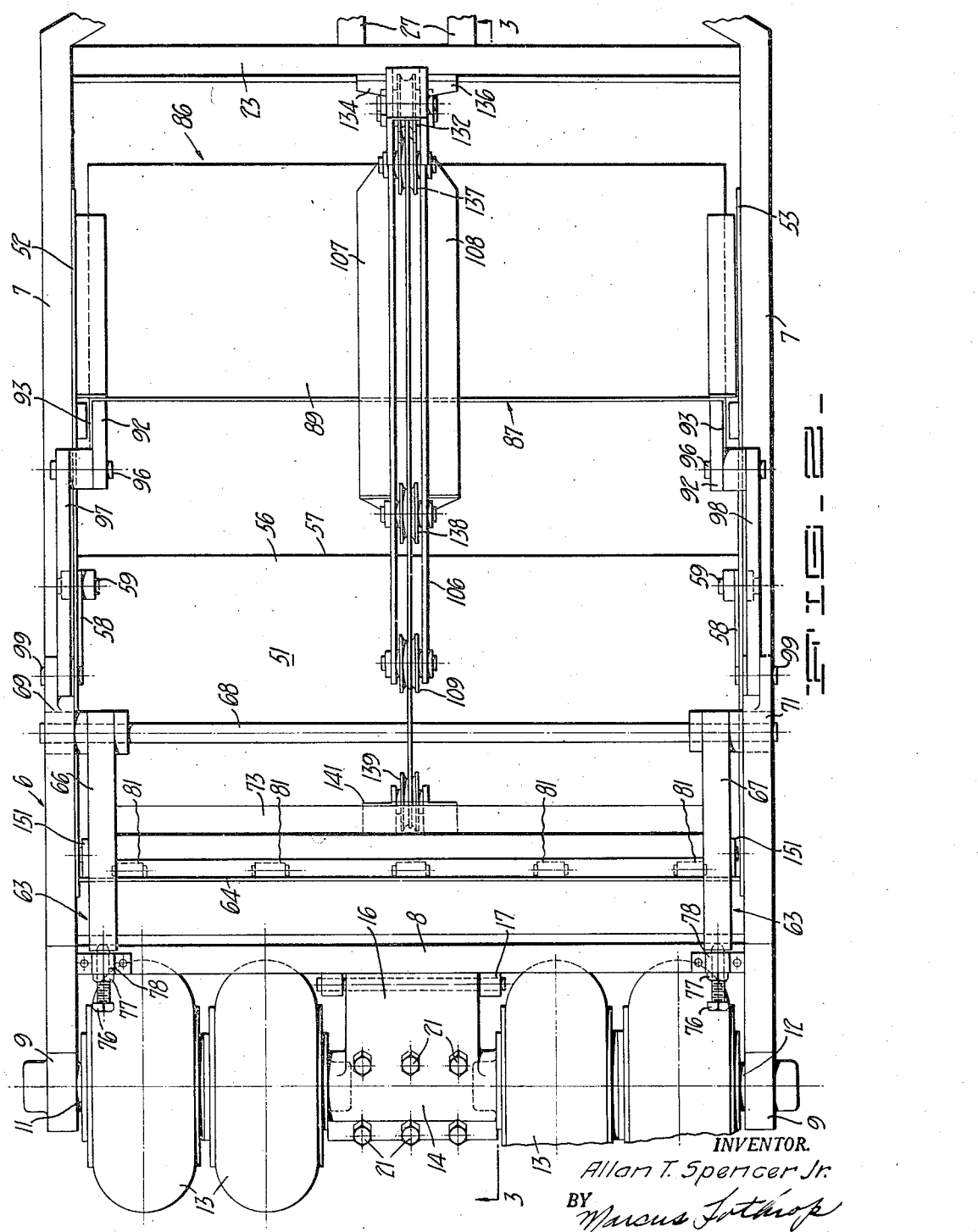

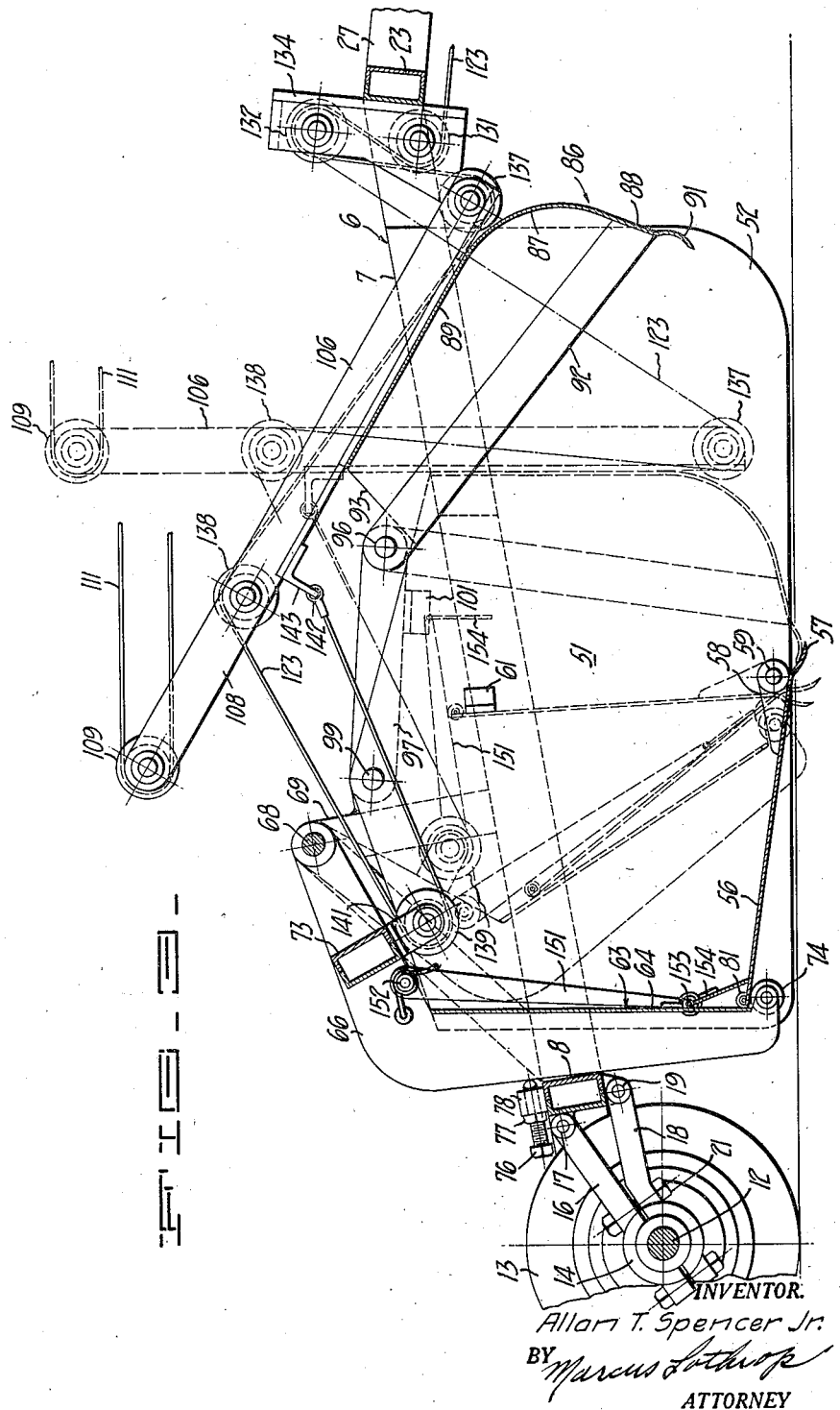

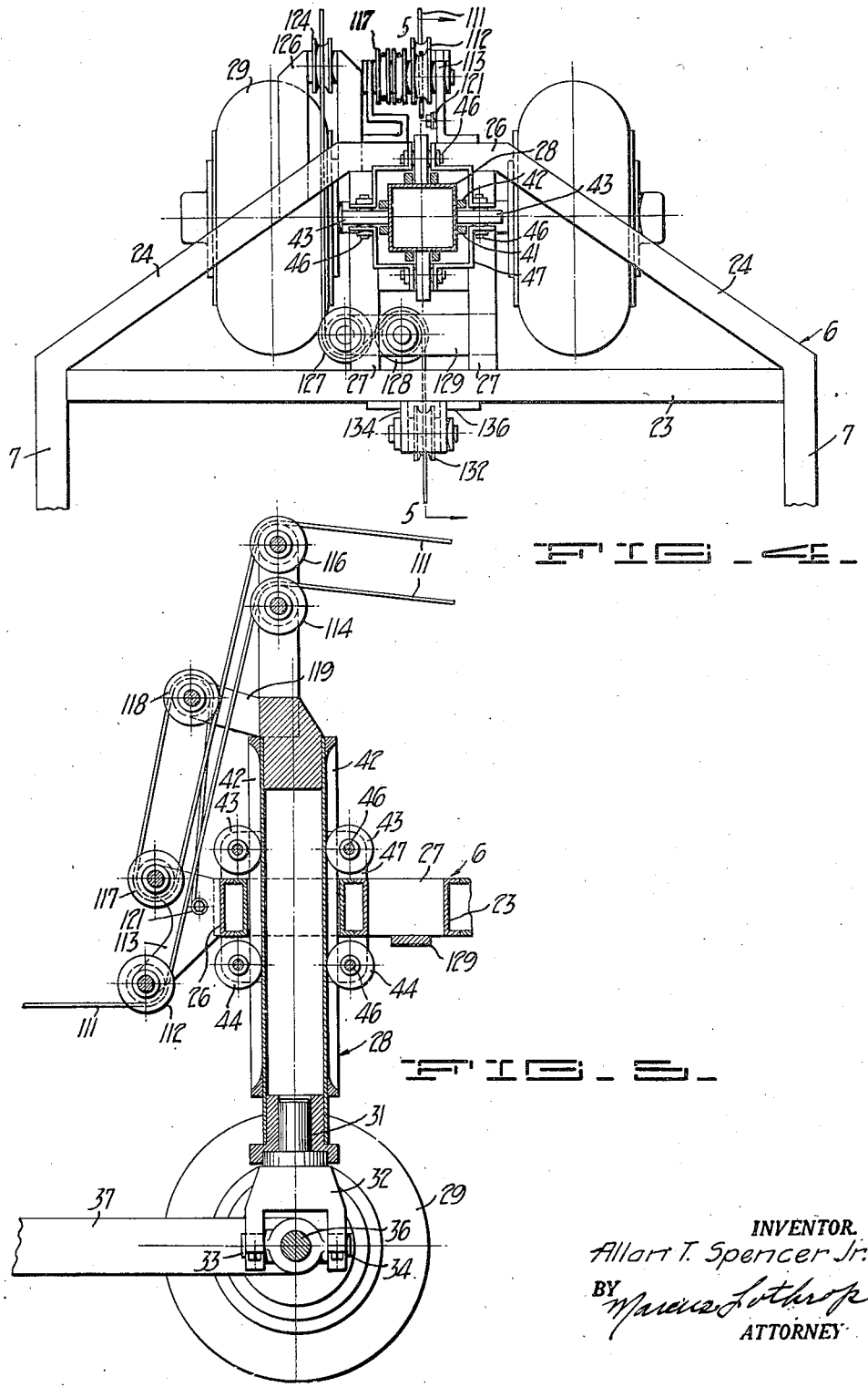

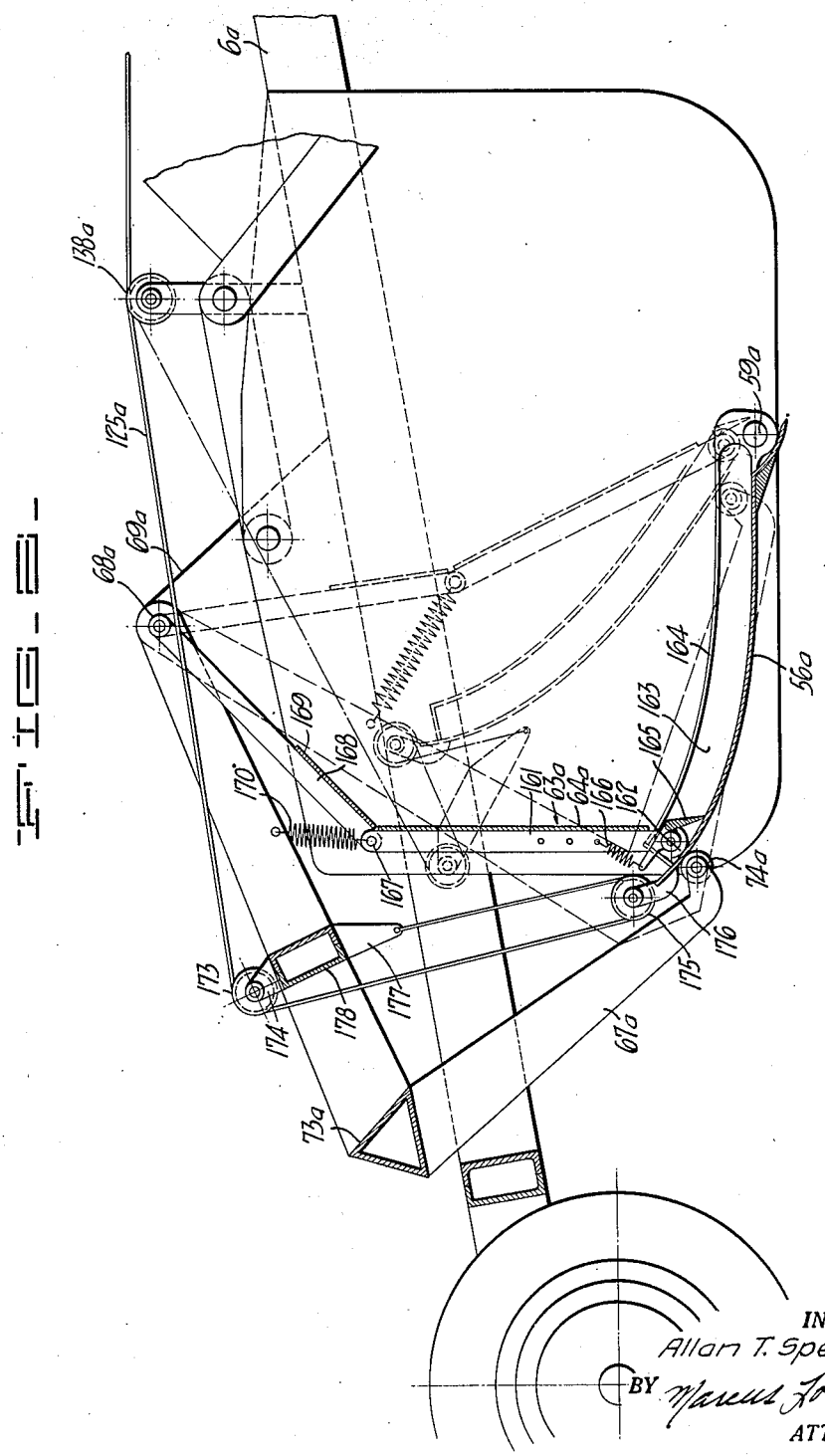

2,323,428

UNITED STATES PATENT OFFICE 2,323,428

EARTH MOVER

Allan T. Spencer, Jr., Gerber, Calif.

Application March 22, 1939, Serial No. 263,446

5 Claims. (Cl. 37—126)

My invention relates to means for moving earth, and is concerned especially with a scraping and carrying mechanism adapted to be propelled over the ground by a draft implement such as a tractor, for the purpose of gathering and discharging earthy material.

An object of my invention is to provide an earth mover which is capable of versatile operation under the ready control of the tractor operator.

Another object of my invention is to provide an earth mover in which the earthy material is positively introduced into the carrier.

A further object of my invention is to provide an earth mover in which the earthy material is positively discharged from the earth carrier.

A further object of my invention is to provide an earth mover which is designed for use with earthy materials of various different consistencies and characteristics and to be beneficially useful in connection with all of them.

Another object of my invention is to provide an earth mover which can be readily fabricated of substantially standard materials.

The foregoing and other objects are attained in the embodiment of the invention illustrated in the drawings, in which Fig. 1 is a side elevation of an earth mover constructed in accordance with my invention;

Fig. 2 is a plan to an enlarged scale and in a different position, showing the earth mover of my invention;

Fig. 3 is a cross-section the plane of which is indicated by the line 3—3 of Fig. 2;

Fig. 4 is a cross-section the plane of which is indicated by the line 4—4 of Fig. 1;

Fig. 5 is a cross-section the plane of which is indicated by the line 5—5 of Fig. 4; and Fig. 6 is a cross-section similar to Fig. 3 but showing a part of the earth mover of my invention in modified form.

In its preferred form, the earth mover of my invention includes a main frame mounted for movement over the ground and on which is supported a main bowl adapted to be vertically moved with respect to the ground. On the main frame is a front bowl provided with means for moving it positively toward and away from the main bowl, and in the main bowl there is included a pivoted bottom pan with which co-operates a pusher for discharging the main bowl, the latter instrumentalities, as well as the front bowl, being provided with appropriate moving and operating means.

While the earth mover of my invention is susceptible of many variations, depending upon the environment in which it is to be utilized, and depending upon various other factors, it is successfully constructed in accordance with the design illustrated in Figs. 1 to 5, inclusive, of the drawings, as well as in the modified form shown in Fig. 6. In the first modification there is provided a main frame 6, comprising a pair of side rails 7 which adjacent their rear ends are spanned by a cross-beam 8. To support the main frame upon the ground, the side beams are extended rearwardly and each of them terminates in a journal block 9 carrying one end of each of a pair of axles 11 and 12 which together mount the ground-engaging wheels 13. These are preferably arranged in two pairs and are demounted by being moved axially along the axles. To provide an additional support, yet to afford a ready means for demounting the wheels, I terminate the axles 11 and 12 within a central muff 14 which includes an upper lever 16 having a pivot connection 17 on the cross-beam 8 and a lower lever 18 connected by a pivot 19 to the cross-beam 8. The two levers, when clamped in closed position about the axle ends 11 and 12 by suitable fastenings 21, afford a rigid support for the central part of the axles, but when the fastenings 21 are removed, either one or both of the levers 16 and 18 can be moved about pivots 17 and 19 to separate the halves of the muff 14, thereby exposing the ends of the axles 11 and 12 over which the wheels 13 can be moved for demounting through the central space between the axles.

Adjacent their forward ends the side beams 7 are spanned by a cross-member 23 and have converging side portions 24 which join a forward beam 26. A pair of spacing beams 27 extend between the cross-beam 23 and the forward beam 26 and encompass a pedestal 28 with respect to which the main frame is movable and which serves as a support for the main frame on a pair of ground-engaging wheels 29. The pedestal 28 at its lower end is provided with a vertical pivot connection 31 depending from which is a yoke 32 encompassing trunnions 33 and 34 projecting respectively forwardly and rearwardly from a front axle 36 at the ends of which the wheels 29 are mounted. A draft yoke 37 is articulated to the axle 36 and extends forwardly to a hitch 38 adapted to be secured to a draft implement such as a tractor.

Since, preferably, the relative movement between the main frame and the pedestal 28 is one substantially of vertical translation, I provide on each of the faces of the pedestal a pair of guide rails 41 and 42 affording a trackway within which operate a pair of rollers 43 and 44 each of which is journaled on an axle 46 mounted in a hollow frame 47 surrounding the pedestal and secured to the spacing beams 27 and the forward beam 26. Since the various rollers 43 and 44 are spaced apart a material distance, and since they are confined between the rails 41 and 42, the relative movement between the main frame and the pedestal is accompanied by only a minimum of resistance and friction in any displaced position thereof, despite turning of the front wheels 29 and despite unevenness in the terrain over which the vehicle is propelled. The interconnection between the main frame and the pedestal is such that while the desired movement is relatively free and can be effected with but a small exertion of power, any other relative movement between the parts is effectively restrained.

In order to confine earthy material to my earth carrier, I preferably provide on the main frame a main bowl, generally designated 51. This bowl includes a number of component parts, among which are side plates 52 and 53 which preferably are welded to the side beams 7 and extend substantially the entire length of the machine from adjacent the rearward cross-beam 8 to a location adjacent the forward cross-beam 23. The external contour of the side plates can be varied according to various requirements, but preferably such side plates extend substantially to the ground when the machine is in excavating position and are approximately rectangular in outline, with the exception of somewhat rounded corners.

Included in the main bowl 51 and forming an earth supporting surface thereof is a bottom pan 56 which is a substantially planar plate extending with but slight clearance between the side plates 52 and 53 and adjacent its forward end being provided with a cutting edge 57 which either is integrally formed with the bottom pan or is a separate part applied thereto and removable for sharpening and replacement after wear.

In accordance with my invention, I preferably so mount the bottom pan 56 that it can be moved between the side walls 52 and 53 of the main bowl for discharging of material therein, and also in such a way that the cutting edge 57 will have a minimum displacement from its optimum cutting position under most circumstances yet can be varied in position to change its angle of cutting under appropriate conditions. For this reason I provide the bottom pan 56 with a pair of side ears 58 each of which overlies a pivot pin 59 projecting from and mounted in its adjacent side plate 52 or 53. The pivot pins 59, being in alignment, afford a transverse axis about which the bottom pan 56 may be pivotally moved, the location of the axis of the pins 59 with respect to the leading portion of the cutting edge 57 being such that the range of movement of the cutting edge extends substantially equally on opposite sides of the axis and raises and lowers with respect thereto about equal amounts both ahead of and behind such axis.

While the pivotal movement of the bottom pan can extend over any selected range, I preferably provide a pair of permanent stops 61 constituting angles projecting from the side walls 52 and 53, to arrest the forward movement of the bottom pan in substantially a vertical position.

To support the bottom pan 56 and also to assist in supporting material contained in the main bowl, I provide a pusher, generally designated 63. This element includes a rear wall 64 of the main bowl, including a substantially planar plate normally arranged in approximately a vertical position and extending between the side walls 52 and 53 with a slight clearance. The end plate 64 is mounted to pivot on the main frame through the instrumentality of a pair of supporting levers 66 and 67. Each of these levers is effectively welded to the rear plate 64 and at its upper end is connected by a pivot shaft 68 to upwardly extending brackets 69 and 71, respectively, incorporated in the main frame and upstanding from the side rails 7 thereof. A transverse reinforcing beam 73 spans the distance between and is connected to the levers 66 and 67. At their lower ends the levers carry rollers 74 underlying the bottom pan 56 and limited in their rearward movement by contact of the levers with adjusting screws 76 held by lock nuts 77 and piercing threaded bosses 78 upstanding from the cross-beam 8.

In addition to the rollers 74 bearing upon the bottom pan 56, the bottom pan itself is provided with antifriction rollers 81 which rest against the plate 64 so that when the levers 66 and 67 are in unison rotated about the axis of the shaft 68 the rollers 74 cam against the under surface of the bottom pan 56 to pivot it upwardly and forwardly toward a discharging position, and at the same time the rollers 81 are available to ride upon the rear plate 64 to reduce the friction between that plate and the bottom pan.

As another instrumentality in retaining earthly material within the main bowl, I provide a front bowl, generally designated 86. This preferably constitutes a plate 87 which has a bottom portion 88 extending substantially at right angles to a forward portion 89 and joined by a merging curve, while extending transversely between the forwardly extending parts of the side plates 52 and 53. The trailing edge of the bottom portion 88, if desired, can be provided with a cutting edge 91, while the front bowl 86 is articulated to the rest of the structure by a pair of support arms 92 to which the plate 87 is joined adjacent the bottom portion 88 and by spacers 93 adjacent the upper portion 89.

Preferably, the side arms 92 are articulated pivotally with respect to the main frame for affording movement of the front bowl toward and away from the main bowl in substantially a horizontal manner; yet in addition I provide means for movably or yieldably pivoting the front bowl to the main bowl in order that when the cutting edge 91 is employed it can be drawn toward the main bowl in a substantially true horizontal line distinct from the arcuate movement which would accompany a fixed pivotal connection. For this reason, adjacent its upper end each of the arms 92 is provided with a pivotal articulation 96 to one of a pair of links 97 and 98, respectively, each of which at its rearward end is provided with a pivotal connection 99 to the adjacent upright 69 or 71 on the main frame. The downward movement of the link 97 is restricted by brackets 101 mounted on the adjacent side plates 52 and 53, but the upward movement of the link is not restrained. Hence, if the front bowl 86 moves about the axis of the articulation 96, and the links 97 are not caused to yield, then the cutting edge 91 moves in an arc about the axis of the pivot 96 as a center until it substantially contacts the cutting edge 57. On the other hand, if the cutting edge 91 should strike some obstruction during its movement toward the main bowl, or if for any reason it is desired to have the cutting edge 91 follow some path other than an arc about the axis of the pivot 96 as a center, then the links 97 are caused to yield upwardly and the cutting edge 91 is made to follow either a rectilinear path or any other path resulting from the composite pivoting about the axes of the pivots 96 and the pivots 99.

Since, in accordance with my invention, I preferably provide means for postively propelling the front bowl in a forward direction away from the main bowl as well as in a rearward direction toward the main bowl, there is preferably mounted on the upright portion 89 of the front bowl a mast 106 conveniently constituted of a pair of angle irons 107 and 108 which are welded to the plate 87 and extend from the lowermost portion of the front bowl to a point considerably above the upper edge of the front bowl. The upper end of the angles 107 and 108 serves as a mounting for a sheave 109 included in the actuating mechanism, since a cable type actuator is preferably employed. While hydraulic, pneumatic or other means may be utilized for actuating the various instrumentalities of my earth mover, I preferably provide a structure in which two flexible cables or wire ropes are utilized to perform all of the operations. Hence, I provide a first cable 111 which extends from an operator-controlled winch drum on the tractor (not shown) and through any suitable leading mechanism and is trained around a sheave 112 mounted on a fork 113 supported on the front beam 26. From the sheave 112 the cable 111 extends around a sheave 114 journaled adjacent the upper end of the pedestal 28, and then is trained around the sheave 109, extending thence around a sheave 116 mounted at the top of the pedestal 22

Since, in accordance with my invention, I preferably interrelate the movement of the front bowl with the vertical movement of the main bowl with respect to the ground, I utilize the cable 111 in such a way that when it is tensioned it not only will move the front bowl toward the main bowl in a closing movement but likewise will be effective to lift or raise the main bowl with respect to the ground; and for that reason, after it passes over the sheave 116, the cable 111 is trained around a sheave 117 journaled in the fork 113 and is then looped around a sheave 118 journaled in a bracket 119 projecting from the pedestal 28, from which the cable 111 extends to a dead end 121 in the fork 113. Thus, when the cable 111 is tensioned, not only is the mast 106 rotated clockwise, as seen in the various figures, but also the sheaves 117 and 118 are caused to approach each other, thus lifting the main frame and the main bowl with respect to the ground.

Whether the rotary movement of the front bowl toward closed position in its entirety is simultaneous with the entire raising movement of the main bowl, or in which sequence these operations occur, depends upon many factors, principally the resistance of the two elements to movement which in turn depends upon their general weight and design and upon the distribution of the load in the machine; that is, whether a major portion of the load is in the front bowl or whether it is in the main bowl. Since the particular order of operation, either during a part of the range of movement or throughout the entire range, varies under different conditions and need not be in any particular sequence so far as the present structure is concerned, I have referred to such interrelated movement in the claims as movement "conjointly."

Further in accordance with my invention, I provide means for moving other instrumentalities by a second cable, and for that reason there is extended from a second, preferably independently controlled winch on the tractor (not shown) a second cable 123 which is guided over a sheave 124 journaled in a bracket 126 projecting from the main frame and is extended over idler sheaves 127 and 128 journaled with their axes parallel on a plate 129 spanning the spacing beams 27. Thence the cable extends through a pair of sheaves 131 and 132 mounted between a pair of upright angles 134 and 136 connected to the front cross-beam 23.

From the uppermost of the sheaves the cable 123 then extends over a sheave 137 journaled at the lower end of the mast 106 and thence around a sheave 138 journaled between the angles 107 and 108 but intermediate the ends thereof. The cable 123 then extends around a sheave 139 journaled in a bracket 141 depending from the cross-beam 73 and is provided with a dead end 142 on a bracket 143 secured to the mast 106 adjacent the pulley 138. When the second cable 123 is tensioned, the tendency is for the sheaves 137 and 132 to approach each other; that is, to rotate the front bowl counterclockwise, as seen in the figures, or toward open position.

Whether or not such relative movement takes place is dependent upon whether or not a superior force is exerted through the cable 111 tending to cause the sheaves 109 and 116 to approach each other; but the tension in the cable 123 is also effective to produce a tendency to cause the sheaves 138 and 139 to approach each other, that is, to produce a counterclockwise movement of the levers 66 and 67, so that the pusher 63 and the bottom pan 56 are conjontly moved from their holding or carrying position into their discharging position. These positions are illustrated especially in Fig. 3, in which the roller 81 is shown as lifting the bottom pan 56 for substantially half of its movement. Beginning at about midway of the movement the roller 74 bears against the pan 56 adjacent the axis of the pivot 59, and for the remainder of the movement very rapidly rotates the bottom pan forwardly until it strikes the stop 61, giving a final throwing movement to the discharged material.

To assist in clearing material from the main bowl, particularly when the material is of an adherent nature, I preferably provide a pair of depending arms 151 at their upper ends connected by pivot pins 152 to the respective levers 66 and 67. Adjacent their lower ends, the arms are connected by pivotal joints 153 to a scraper blade 154 extending transversely of the main bowl and in substantial contact with the bottom pan 56. Preferably, a relatively light coil spring is interposed between the scraper 154 and the arms 151, tending to cause the scraper to rest in contact with the bottom pan 56, and a similar light coil spring is interposed between the levers 151 and the arms 66 and 67 to urge the levers 151 toward the end plate 64. Since the rearmost edge of the bottom pan virtually scrapes over the end wall 64, and since the plate 154 virtually scrapes the bottom pan 56, there is an action which causes all adhering earthy material to be dislodged.

In this modification of the invention, by manipulation of the two cables 111 and 123, either individually or in concert with more or less tension on each, an operator can open and close the front bowl positively, can position the parts at a greater or a less distance from the ground, and can positively manipulate the pusher and the bottom pan to discharge material. When the cables are relieved of tension, the parts in general return gravitally to their lowermost position, although in the case of the pusher, if desired, or in the case of the bottom pan, or in the case of both of them, the effect of gravity can be augmented, if necessary, to produce a sufficiently rapid return to normal position.

In customary use, this structure is advanced over the terrain and, when the front bowl is raised, receives earthy material within the main bowl, following which the front bowl is partially lowered to receive forwardly rolling portions of the gathering earthy material, following which the front bowl and the main bowl are brought into substantial abutment and closed position to transport the material at a selected elevation above the ground. Following this, at a discharge location the front bowl is moved to open position and the main bowl is emptied by operating the bottom pan and the pusher. As an alternative and special feature to pick up large boulders or comparable material, the entire machine is moved so that the main bowl and the front bowl are spaced apart in a position above the material. Upon lowering the main frame, the main bowl is then situated behind the material, and the front bowl is ahead of it. When the cable 111 is tensioned, the front bowl is brought toward the main bowl, thereby picking up the material, and, following this, the main frame is lifted thereby raising the material for hauling to a discharge location.

As disclosed in Fig. 6, under certain circumstances it is deemed preferable to provide the conjoint action of the pivoted bottom pan and the pusher structure in a way which produces a somewhat different type of motion and discharging characteristics. In this arrangement the bottom pan 56a is mounted on pivots 59a and is contoured to provide a camming action with rollers 74a which are mounted at the extremity of each of a pair of levers 67a which are joined by a beam 73a and are mounted on pivots 68a in turn carried by brackets 69a projecting upwardly from the main frame 6a.

Co-operating with the bottom pan 56a is a pusher 63a including an end wall 64a having reinforcing members 161 which at their lower extremities are provided with rollers 162 designed to operate in cam grooves 163 formed between the bottom pan 56a and a ledge 164 evenly spaced therefrom. Also pivoted adjacent the lower terminus of the members 161 is a scraper blade 165 which is held by coil springs 166 into scraping contact with the bottom pan 56a.

The upper ends of the members 161 are connected by pivot pins 167 to supporting levers 168 at their upper ends mounted to swing about the pivots 68a and carrying a back plate 169 which supplements the plate 64a. Preferably, movement about the pivots 167 is restrained by springs 170 connected to the pins 167 and to levers 67a, the extreme positions being indicated by the dotted lines and by the solid lines in Fig. 6.

In order conjointly to actuate the bottom pan and the pusher between holding or carrying position and discharging position, I extend a cable 123a from a pulley 138a corresponding to the pulley 138 on the mast, to pass around a sheave 173 which is journaled in a bracket 174 mounted on the beam 172. From there the cable 123a extends downwardly to pass around a sheave 175 journaled in a rearwardly projecting extension 176 of the bottom pan 56a and is then anchored to a bracket 177 depending from a cross-beam 178 spanning the levers 67a. Thus when the cable 123a is tensioned, force is exerted upon the lever 67a tending to move it counterclockwise in Fig. 6 so that the roller 74a cams against the bottom pan 56a tending to rotate it clockwise and to discharge. The tension in the cable 123a is also effective directly to lift upon the the bottom pan 56a through the pulley 175, and, by means of the camming action between the cam track 163 and the roller 162, the pusher 63a is moved toward discharging position, carrying the plate 169 with it and tensioning the restoring spring 170. If the plate 64a should not immediately move forward, the resisting influence of the load and the line of action of the spring 170 may cause the plate 64a to lift so that the levers 168 strike the levers 67a being thereby propelled toward discharge position.

Then, when the tension upon the cable 123a is released, the weight of the bottom pan 56a restores it pivotally to its carrying position, and the camming action returns the levers 67a and the pusher 63a to their normal position, assisted by the spring 170. All of these motions are effected substantially in unison or with a delayed action, or with or without supplement by additional springs, if desired. With this form of the invention, as well as with that shown in the other figures, the action is to provide a commodious earth-carrying main bowl yet to move various portions of the main bowl in such a way that the material therein is positively discharged.

I claim:

1. An earth mover comprising a main frame supported for movement over the ground, a main bowl mounted on said main frame for vertical movement with respect to the ground, a pusher mounted to sweep through said main bowl, a front bowl movable toward and away from said main bowl, means for conjointly sweeping said pusher through said main bowl and moving said front bowl away from said main bowl, and means for conjointly moving said main bowl vertically and moving said front bowl toward said main bowl.

2. An earth mover comprising a main frame supported for movement over the ground; a main bowl mounted on said main frame for vertical movement with respect to the ground; a front bowl mounted on said main frame for movement toward and away from said main bowl; a bottom pan included in said main bowl and mounted for pivotal movement with respect to said main frame; a pusher mounted to sweep through said main bowl; a first cable connected to raise said main frame and move said front bowl toward said main bowl when tensioned; and a second cable connected to move said front bowl away from said main bowl and move said pusher through said main bowl and pivot said bottom pan when tensioned.

3. An earth mover comprising a main frame supported for movement over the ground; a main bowl mounted on said main frame for vertical movement; a front bowl mounted on said main frame for movement toward and away from said main bowl; a bottom pan forming the bottom of said main bowl and movable through a portion thereof; a pusher mounted to move through said portion of said main bowl; means for effecting concerted movement of said bottom pan and said pusher; means for conjointly moving said main bowl vertically and said front bowl toward said main bowl; and means for conjointly moving said front bowl away from said main bowl and said bottom pan and said pusher through said portion of said main bowl.

4. An earth mover comprising a main frame, means for supporting said frame for movement over the ground, a main bowl on said main frame, means affording movement of said main bowl toward and away from the ground, a front bowl on said main frame and having a lower edge, means affording movement of said front bowl back and forth over the ground with said lower edge travelling in a substantially horizontal path, and conjoint means for moving said main bowl away from the ground and said front bowl toward said main bowl.

5. An earth mover comprising a main frame, means for supporting said main frame for movement over the ground, a main bowl on said main frame and having a front edge, a front bowl disposed ahead of said main bowl and having a lower edge movable into a position adjacent said front edge, a connector pivotally related to said main frame, a bracket fixedly related to said main frame for limiting pivotal movement of said connector, a pivotal connection between said front bowl and said connector substantially above said front edge, and means for moving said front bowl with said lower edge travelling in a substantially horizontal path.

ALLAN T. SPENCER, Jr.